United States Patent [19]

Rickborn

[11] Patent Number: 4,825,049
[45] Date of Patent: Apr. 25, 1989

[54] CARBON FILM COATED REFRACTORY FIBER CLOTH

[75] Inventor: Steven F. Rickborn, Campbell, Calif.

[73] Assignee: Northrop Corporation, Hawthorne, Calif.

[21] Appl. No.: 28,121

[22] Filed: Mar. 19, 1987

Related U.S. Application Data

[60] Division of Ser. No. 811,018, Dec. 18, 1985, Continuation-in-part of Ser. No. 714,090, Mar. 20, 1985, Continuation-in-part of Ser. No. 672,396, Nov. 16, 1984.

[51] Int. Cl.$^4$ ............................................. H05B 3/34
[52] U.S. Cl. ................................... 219/545; 427/249
[58] Field of Search .................. 219/545, 10.61 R; 428/242, 244, 260, 288, 289; 427/122, 228, 249, 255; 252/502

[56] References Cited

U.S. PATENT DOCUMENTS 3,349,359 10/1967 Morey ................................. 219/545
4,477,707 10/1984 Kim ............................. 219/10.61 R

*Primary Examiner*—E. A. Goldberg
*Assistant Examiner*—M. M. Lateef
*Attorney, Agent, or Firm*—Fliesler, Dubb, Meyer & Lovejoy

[57] ABSTRACT

A flexible electrically conducting cloth comprising a plurality of intermingled or interwoven fibers of a refractory material having a sheet resistance above 1000 ohms per square. A conducting coating having at least about 70 atomic percent carbon encapsulates a majority of the fibers. The coating is applied in sufficient quantity to render the cloth electrically conducting with a sheet resistance of about 0.1 to about 1000 ohms per square, the coating having been formed by chemical vapor deposition at 800° C. to 1200° C. A flexible electrically conducting cloth having a length and a breadth is also provided comprising a plurality of intermingled or interwoven fibers of a refractory material having a sheet resistance above 1000 ohms per square. A conductive coating including at least about 70 atomic percent carbon encapsulates a majority of the coating. The coating is in sufficient quantity to render the cloth conducting with a sheet resistance between 0.1 and 1000 ohms per square. The cloth has a resistance across its breadth uniform to within about ±10% and a controllable resistance along its length.

8 Claims, 2 Drawing Sheets

CARBON FILM COATED REFRACTORY FIBER CLOTH

CROSS-REFERENCE

This is a division, of Ser. No. 811,018, filed Dec. 18, 1985.

This application is a continuation-in-part of U.S. application Ser. No. 714,090 filed Mar. 20, 1985 which is in turn a continuation-in-part of co-pending application Ser. No. 672,396, filed Nov. 16, 1984, both commonly assigned herewith.

TECHNICAL FIELD

The invention relates to an electrically conductive cloth, generally of a flexible nature, and useful as an electrical resistance heater, an antenna, an electromagnetic field reflector, an electromagnetic field shield, or the like and electrically conductive pluralities of parallel individual fibers and bundles of fibers such as rovings and yarns.

BACKGROUND ART

The production of coated refractory fibers is known and is taught, for example, in U.S. Pat. No. 3,428,519, issued Feb. 18, 1969 to Carl M. Zvanut. U.S. Pat. No. 3,565,683, issued Feb. 23, 1971 to Charles R. Morelock shows the coating of carbon-coated ceramic fibers with an electrically conductive boro-carbon coating. This process requires that the fiber to be coated be electrically resistively heated. Morelock's process is therefore not suitable for preparation of carbonaceous films on electrically non-conductive fibers. Such coated fibers as are discussed in the abovementioned patents have not been formulated into either woven cloths or non-woven cloths. And, if one were to attempt to do this it is highly unlikely that the coating would remain intact and undamaged.

U.S. Pat. No. 3,676,293, issued July 11, 1972 to Bernard A. Gruber, discloses a fabric of silicon carbide fibers coated with pyrolyzed carbon from a resin. The end product is a refractory. The silicon carbide of this patent is not electrically insulating but is instead a semiconductor.

U.S. Pat. No. 3,969,124, issued July 13, 1976 to Wilfred S. Stewart, discloses the formation of high strength shaped carbonaceous articles by shaping and curing particles of carbon, graphite and mixtures thereof with a resin binder and thereafter pyrolyzing the shaped article. The bulk density of the article can be increased and the porosity reduced by vapor deposition of graphite in its pores. The article may be reinforced with fibers and whiskers of various refractory materials including aluminum oxide. Such shaped articles are not, however, in the nature of a flexible cloth.

U.S. Pat. No. 4,321,154, issued Mar. 23, 1982 to Francois Ledru discloses a thermal insulating material comprising insulating mineral fibers bonded in a matrix which is formed in part of pyrolytic carbon, The resulting material has very low heat conductivity. There is no teaching of the material being electrically conducting.

U.S. Pat. No. 4,407,969 discloses a flexible thermally insulative refractory composition which is resistant to attack by molten material. It may contain inorganic fiber and any of various polymers. The composition is normally insulative.

U.S. Pat. No. 3,281,261 discloses coating a fabric such as rayon, cotton or polyacrylate with a refractory such as alumina and then carbonizing to provide a ceramic fabric having considerable strength.

U.S. Pat. No. 4,510,077, issued Apr. 9, 1985 to Richard K. Elton shows the batchwise production of fabrics made of fibers and coated with a pyrolyzed organic material with the organic material being such that it does not boil or sublime at the temperature of pyrolysis. The process preferably operates at a temperature of 650° to 750° C. and results in a product having differing resistivities from one part of the sample to another.

The prior art neither teaches nor suggests an electrically conducting cloth, a plurality of parallel individual fibers or a bundle of fibers having an appropriate and reproducible sheet resistance made by a chemical vapor deposition process.

DISCLOSURE OF INVENTION

The present invention is directed to solving one or more of the problems as set forth above.

In accordance with an embodiment of the present invention a flexible electrically conducting cloth is set forth comprising a plurality of intermingled or interwoven fibers of a refractory ceramic or of a refractory vitreous material, the sheet resistance of which exceeds 1000 ohms per square. A majority of the fibers are encapsulated by a conducting coating, the coating including at least about 70 atomic percent carbon, the coating being applied in sufficient quantity to render the cloth electrically conducting with a sheet resistance which lies between about 0.1 ohm per square and about 1000 ohms per square, the coating having been formed by chemical vapor deposition at a temperature in a range from about 800° C. to about 1200° C.

In accordance with another embodiment of the present invention a flexible electrically conducting cloth is set forth having a length and a breadth and comprising a plurality of intermingled or interwoven fibers of a refractory ceramic or of a refractory vitreous material the sheet resistance of which exceeds 1000 ohms per square. A majority of the fibers are encapsulated by a conducting coating which includes about 70 atomic percent carbon, the coating being applied in sufficient quantity to render the cloth electrically conducting with a sheet resistance which lies between about 0.1 ohm per square and about 1000 ohms per square, the cloth having a resistance across its breadth uniform to within about ±10% and a controllable resistance along its length.

The present invention provides a web having a carbonaceous film which has a controllable resistance along its length and a substantially uniform resistance across its breadth. The web can be in the nature of a woven or non-woven fabric, a yarn, a roving or a plurality of parallel individual fibers, either touching or spaced slightly apart, and may be used as formed or may be thereafter processed. Furthermore, throughput can be at a very high rate whereby the coated web can be produced in large quantities. Unexpectedly, one gets true chemical vapor deposition by the process of the present invention rather than mere surface charring of the organic precursor. The resulting cloth has particularly uniform sheet resistance.

BEST MODE FOR CARRYING OUT INVENTION

Figure 1:
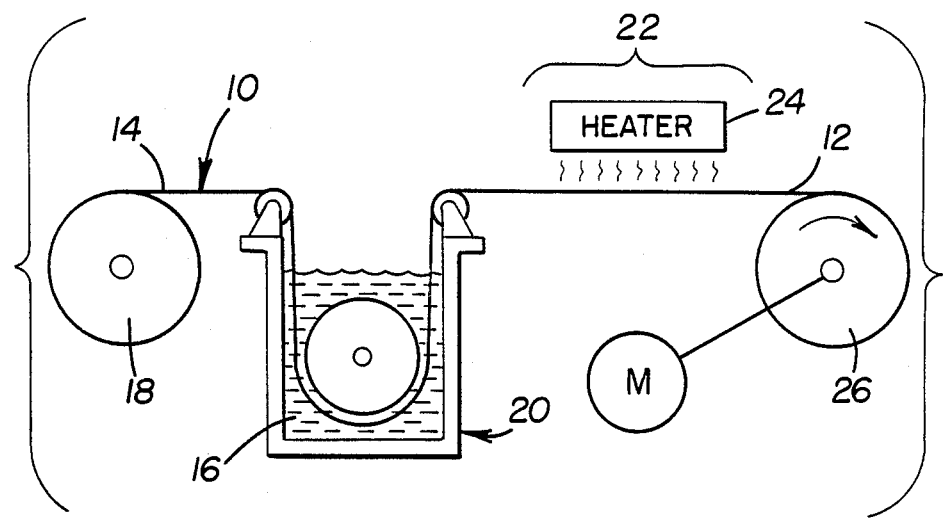
FIG. 1 illustrates, schematically, a process in accordance with an embodiment of the present invention.

In accordance with the present invention a process, as shown schematically in FIG. 1, is set forth for the continuous vapor deposition of a carbonaceous film onto a longitudinally extending web 10 which is comprised of a plurality of matted or woven fibers, a plurality of parallel individual fibers, or a bundle of fibers, of a refractory ceramic or refractory vitreous material. The web 10 has a leading end 12 and a trailing end 14. The resulting product is a web 10 having a coating thereon, the web 10 having a controllable resistance along its length and breadth.

The fibers are preferably formed of a refractory ceramic material, for example of a refractory metal oxide such as for instance: $Al_2O_3$, $Al_2O_3 \cdot K_2O \cdot SiO_2$, $Al_2(SiF_6)_2$, $Al_2SiO_5$, $BaO$, $BaSO_4$, $Ba_2V_2O_7$, $3BeO \cdot Al_2O_3 \cdot 6SiO_2$, $BeO$, $Cd_2P_2O_7 \cdot 2H_2O$, $CdSiO_3$, $CaO$, $CaSiO_3$, $CaSO_4$, $Ce_2O_3$, $Cr_2O_3$, $Cr(PO_4) \cdot 3H_2O$, $Fe_3O_4$, $HfO_2$, $La_2O_3$, $PbO$, $PbWO_4$, $Li_4SiO_4$, $MgO$, $MnP_2O_7$, $MnSiO_3$, $MoO_3$, $Mo_2O_3$, $NiO$, $Ni_2O_3$, $SiO_2$, $SrSiO_3$, $SrO$, $Ta_2O_5$, $TiO_2$, $Ti_2O_3$, $WO_3$, $W_2Si_3$, $UO_2$, $V_2O_3$, $V_2O_4$, $Zr(OH)_2$, $ZrO_2$, non-oxide ceramic refractories such as carbides, e.g., silicon carbide, nitrides, e.g., boron nitride or metal nitrides or mixtures of ceramic refractory materials such as aluminum borosilicate, etc. Other useful materials include refractory vitreous materials such as silicate glass or magnesium aluminosilicate glass. More generally, however, any type of glass fibers can be utilized which can be formed into a web, e.g., woven into or matted into a fabric, provided that the glass fibers can withstand the deposition temperature. The sheet resistance of the plurality of the web from which the fabric is made should exceed 1,000 ohms per square.

Measurement of sheet resistance is a standard test and consists of pressing two 1 inch cubes of copper against a surface of the cloth 10 with the two copper pieces being 1 inch apart and with parallel edges whereby an area of 1 inch×1 inch on the web 10 is between the pieces of copper. The resulting resistance from one piece of copper to the next is then measured. This is known as the resistance per square. This test is described in, for example, *Electronic Design*, Feb. 15, 1974, at page 96. When the fibers are a plurality of parallel fibers or a bundle of fibers the sheet resistance is measured with the fibers packed in intimate contact with one another.

In accordance with the present invention a conducting coating is formed which encapsulates a majority of the fibers and more preferably encapsulates substantially all of the fibers. Substantially each fiber is substantially completely coated with the coating. The coating includes at least about 70 atomic percent carbon and is generally applied in a sufficient quantity to render the web 10 electrically conducting with a sheet resistance which lies between about 0.1 ohm per square and about 1,000 ohms per square. Basically, the coating is a pyrolyzed carbon coating.

Figure 2:
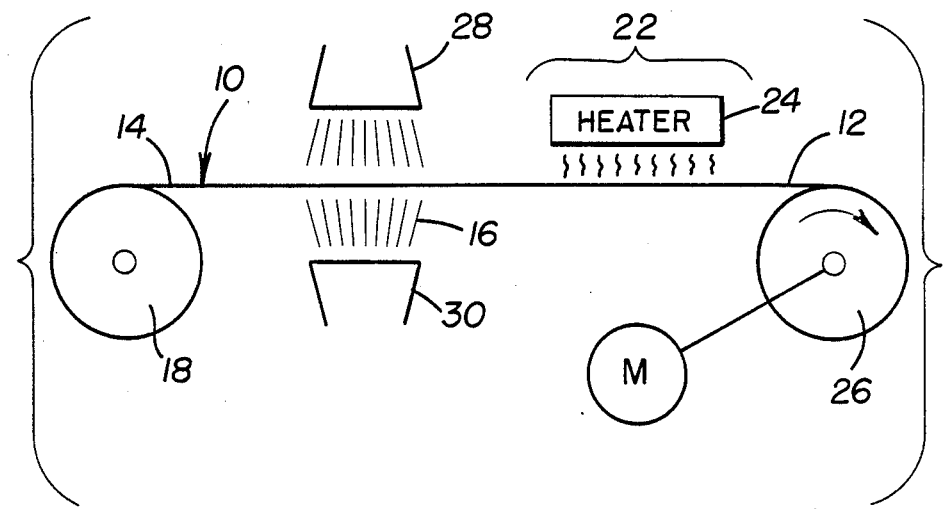
FIG. 2 illustrates, schematically, a process in accordance with an alternative embodiment of the present invention.

In accordance with the process of the invention an organic precursor 16 is applied to the web 10 in liquid and/or solid form. In some instances a solution of the organic precursor 16 will be applied and the solvent removed, e.g., evaporated, to leave the dried organic precursor 16 on the web 10. The applying occurs at a temperature below the sublimation, boiling or decomposition temperature of the organic precursor 16, generally at ambient temperature. In accordance with the embodiment of FIG. 1 the web 10 is led from a feed reel 18 through a vessel 20 which includes the organic precursor 16 and wherein the web 10 passes beneath the surface of the organic precursor 16. Thereafter, the web 10 is led into a hot chemical vapor deposition zone 22, past a heater 24, and then out of the hot chemical vapor deposition zone 22 and onto a takeup reel 26. FIG. 2 illustrates an embodiment wherein the organic precursor 16, which may be a liquid, a solid or mixture thereof, is applied to the web 10 using appropriate spray nozzles 28 and 30.

While these methods for applying the precursor to the web 10 are preferred, it will be obvious that virtually any method of applying the precursor may be used, provided only that the method of such applying yields a reasonably uniform distribution of the precursor across the web 10 and a controllable distribution of the precursor along the length of the web 10.

In the case wherein the organic precursor is one which will sublime or boil prior to decomposition, such precursor should be selected to be one which sublimes or boils at a temperature in excess of about 400° C. and below about the temperature maintained in the hot chemical deposition zone 22. In the case wherein the organic precursor is of such a nature that it decomposes at a temperature below its sublimation or boiling temperature, such decomposition temperature should be above about 300° C.

It is essential to the practice of the present invention that the organic precursor, under the residence time and temperature conditions of the deposition zone, is selected to be substantially completely converted by sublimation, boiling and/or decomposition to one or more vaporous species under the conditions in the deposition zone. This assures that the process being carried out is one of chemical vapor deposition as opposed to mere surface charring.

The residence time of each portion of the web 10 in the deposition zone 22 should be controlled to be short enough so that the resulting conductively coated web 10 is not deleteriously effected. Generally, the residence time will be no more than about 100 minutes. It is an advantage to the practice of the present invention that the residence time of each portion of the web 10 within the deposition zone 22 can be restricted to be less than about 30 minutes and preferably less than about 15 minutes since this assures a high production rate. The minimum residence time is that which will be just sufficient to convert substantially all of the precursor to one or more vaporous species.

The temperature within the hot chemical vapor deposition zone must be maintained within a range which falls between about 800° C. and about 1200° C. If lower temperatures than 800° C. are utilized the vapor species resulting from the organic precursor are not sufficiently pyrolyzed to form a coating of the desired properties. If higher temperatures are utilized the properties of the web may be deleteriously effected.

The deposition zone must be maintained substantially oxygen-free. This can be accomplished by working under an inert atmosphere, for example, nitrogen, argon, or the like, or working with a vacuum with the only pressure being that due to the vapor species produced from the organic precursor. For ease of operation it is preferred that the process be carried out under an inert atmosphere. In such an instance the inert atmosphere can be utilized to keep oxygen out of the hot chemical vapor deposition zone.

It is essential to the present invention that the heater 24 have sufficient capacity to rapidly heat the web to the desired temperature in the range between about 800° C. and about 1200° C. Thus, a relatively high capacity heater 24 should be utilized.

It is preferred that the conducting coating or film which encapsulates the fibers comprise no more than about 17 weight percent of the web 10, more preferably no more than about 10 weight percent of the web 10 and still more preferably no more than about 5 weight percent of the web 10. The coating preferably comprise at least about 0.001 weight percent of the web 10.

It should be noted that it is not essential that the organic precursor cover the entire surface of the web 10 although such is preferable. Since the process taking place in the hot chemical vapor deposition zone 22 is true chemical vapor deposition, it is possible to coat only a portion of the web 10 and still to obtain uniform coating of the film across the web 10. However, since the vaporous species tend to deposit somewhat near to the point of their formation, it is desirable to have a relatively uniform coating of the precursor.

The process of the present invention is carried forth to provide a web 10 in accordance with the present invention with a desired resistance which falls within a range from about 0.1 ohm per square to about 1,000 ohms per square. Uniformity of coating is obtained over the surface of the web 10 from lateral edge to lateral edge and from leading end to trailing end. The amount of coating can be varied by increasing or decreasing the amount of the organic precursor 16, if desired. Thus, for example, if one desires to make a 100 meter length of web 10 with a sheet resistance of 10 ohms per square and then an additional 100 meter length of web 10 with a resistance of 800 ohms per square, one can simply change the amount of organic precursor 16, by decreasing that amount after the first 100 meters of web 10 have been coated, and one will then obtain a higher (800 ohms per square) resistance for the following 100 meters of web 10. Thus, one may selectively obtain different amounts of coating along the length of the web 10. In such an instance, however, the sheet resistance laterally across the web 10 at any particular longitudinal position will be substantially uniform.

Figure 3:
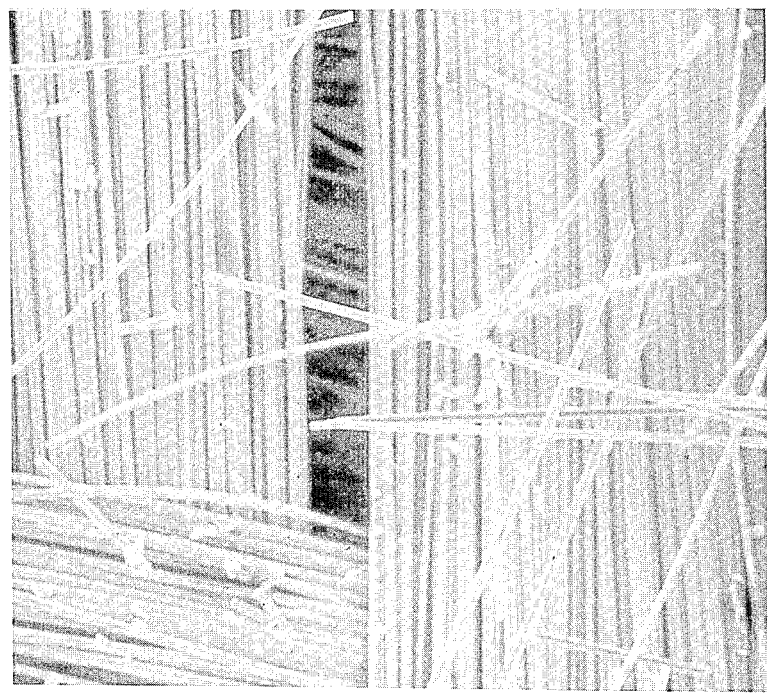
FIG. 3 is a photomicrograph illustrating a flexible electrically conducting cloth in accordance with the present invention at one hundred times magnification.
Figure 4:
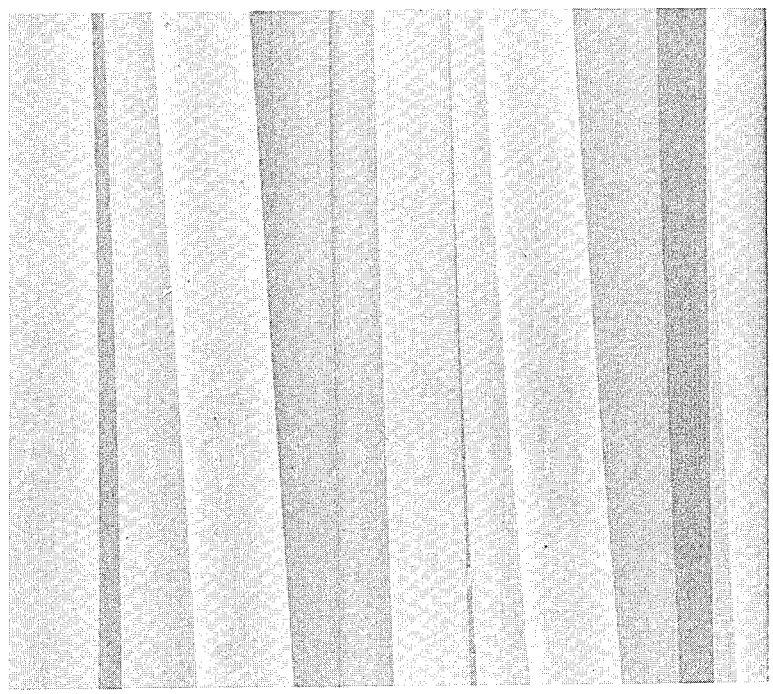
FIG. 4 is a photomicrograph similar to that of FIG. 8 but at one thousand times magnification.

The process of the invention is advantageously used to produce woven or non-woven, generally flexible, fabrics by using woven or non-woven refractory ceramic or refractory vitreous fibers as the web 10. FIGS. 3 and 4 show a web 10 in accordance with the present invention.

The process of making a cloth in accordance with the present invention can also be carried forth using a plurality of parallel individual fibers or a bundle of fibers as the web 10 to provide a plurality of parallel individual fibers or a bundle of fibers with a desired electrical resistance. Uniform control of coating is obtained along the lengths of the plurality of parallel individual fibers or bundle of fibers from leading end to trailing end. The amount of coating can be varied by increasing or decreasing the amount of organic precursor 16, if desired. Across the width of the plurality of parallel individual fibers or bundle of fibers the coating is uniform. The electrical resistance of the fiber or bundle of fibers will depend on the amount of coating and the size and number of fibers present in the bundle. One may selectively obtain different amounts of coating along the length of the plurality of parallel individual fibers or bundle of fibers, providing a gradation of electrical resistance along the length of the fibers or bundle of fibers.

When an inert atmosphere is utilized in the hot chemical vapor deposition zone 22 the inert atmosphere will generally be swept through the hot vapor deposition zone 22 to remove any undesired pyrolysis products. A vacuum pump may be used to impel this flow or, it may be impelled simply by introduction of the inert gas under pressure. When a vacuum is used in the hot chemical vapor deposition zone 22 any undesired pyrolysis products will be removed by the vacuum in a conventional manner.

Generally, the amount of film deposited on the web 10 can be controlled to ensure that the web 10 remains flexible. This is particularly useful when the web 10 is in the nature of a cloth. Very high amounts of film formed on the web 10 will, of course, reduce such flexibility.

The film or coating which is deposited by chemical vapor deposition on the web 10 is a carbonaceous film which has a controllable resistance along its length and generally contains at least about 70 atomic percent carbon and more usually at least about 85% carbon.

An advantage of the present invention is that great control of uniformity can be achieved because of the continuous nature of the process. The uniformity of coating achieved by the present invention cannot be achieved by coating processes described in the prior art. A second advantage of the present invention is that it allows the manufacture of the coated web, be it a fabric, a plurality of parallel individual fibers, or a bundle of fibers, at a very high rate, and therefore at low cost.

The chemical structure of the organic prescursors is of virtually no importance to the practice of the present invention so long as it has the sublimation, boiling, and/or decomposition temperature ranges as described above. Generally, the organic precursor will be selected from organic precursors in which a majority of the atoms of the compound are carbon and hydrogen atoms. It is essential to the practice of the present invention that the organic precursor be substantially completely converted by sublimation, boiling and/or decomposition to one or more vaporous species in the deposition zone. The chemical vapor deposition which occurs in the zone is, in essence, the cehmical vapor deposition of the vaporous species produced from the organic precursor. That is, what is occurring is true chemical vapor deposition rather than mere charring on the surface of the web 10.

The invention will be better understood by reference to the following illustrative examples:

EXAMPLE 1

A web of Nextel ® (a registered trademark of 3M Company) aluminum borosilicate cloth, 3.5 inches wide by 30 feet long, was sprayed with a solution containing poly(styrene) so that after drying the web comprised approximately 0.1% poly(styrene) by weight. The web was then pulled through a 900° C. hot zone with a residence time of approximately 8 minutes. The process was conducted in a nitrogen atmosphere. After the initial 6 feet of cloth, 24 feet of ceramic cloth evenly coated with a carbonaceous film was obtained. The sheet resistance of the coated cloth along the entire 24 foot length was 227 ohms/square, ±24 ohms/square.

EXAMPLE 2

A web of Nextel® aluminum borosilicate cloth, 3.5 inches wide by 30 feet long, was evenly coated with 18 gram powdered solid zinc phthalocyanine, giving a loading of about 0.014 gram zinc phthalocyanine per square inch of web. The web was then placed under a vacuum and pulled through a 900° C. hot zone with a residence time of about 24 minutes. After the initial 6 feet of cloth, a 24 foot length of cloth evenly coated with a carbonaceous film was obtained. The sheet resistance of the coated cloth along the entire 24 foot length was 18 ohms/square ±2.4 ohms/square.

EXAMPLE 3

A web of Nextel® aluminum borosilicate cloth, 3.5 inches wide and 30 feet long, was evenly coated with 3 gram powdered solid zinc phthalocyanine. The web was then placed under a vacuum and pulled through a 900° C. hot zone with a residence time of 5 minutes. After the initial 6 feet of web, a 24 foot length of cloth evenly coated with a carbonaceous film was obtained. The sheet resistance of the coated cloth along the entire 24 foot length was 536 ohm/square ±63 ohms/square.

EXAMPLE 4

A web of Nextel® aluminum borosilicate cloth 3.5 inches wide and 30 feet long was dip coated with a solution of poly(styrene). After drying, the cloth was coated with about 0.006 gram poly(styrene) per square inch of cloth. The web was placed under an atmosphere of nitrogen and pulled through a hot zone at 900° C. with a residence time of about 8 minutes. After the initial 6 feet of web, a 24 foot length of cloth evenly coated with a carbonaceous film was obtained. The sheet resistance of the coated cloth along the entire 24 foot length was 33 ohm/square ±2.4 ohm/square.

In each of the above examples the first 6 feet of the cloth were not evenly coated because they were resident in the deposition zone during the heat up. The remaining 24 feet of cloth are representative of what is obtained during continuous operation of the process.

The above examples demonstrate that webs having controllable and very uniform sheet resistance are provided in accordance with the present invention. As will be noted, the resistance varies no more than ± about 10%.

EXAMPLE 5

An approximately 30 feet long roving composed of approximately 2,800 S-2 Glass® filaments of 0.00038 inches in diameter, manufactured by Owens-Corning Fierglass Corporation was dip-coated with a solution of 4% polystyrene in methylene chloride and then allowed to dry in air. The coated roving ws then pulled through a hot zone held at 856° C. under a flow of nitrogen with a residence time of 3.5 minutes. After cooling, the coated roving had a resistance of 314 ohms/centimeter along its length. The resistance was measured between two alligator clips placed one centimeter apart.

EXAMPLE 6

An approximately 30 feet long roving composed of approximately 2,800 S-2 Glass® filaments of 0.00038 inches in diameter, manufactured by Owens-Corning Fiberglass Corporation was dip-coated with a solution of 4% polystyrene in methylene chloride and then allowed to dry in air. The coated roving was then pulled through a hot zone held at 900° C. under a flow of nitrogen with a resistance time of 3.5 minutes. After cooling, the coated roving had a resistance of 68 ohms/centimeter along its length. The resistance was measured between two alligator clips placed one centimeter apart.

INDUSTRIAL APPLICABILITY

The present invention provides a web 10 which is useful as a resistance heater, an electromagnetic shield, an electromagnetic reflector, an antenna, or the like. The process of the present invention allows the production of such a web 10 from a wide variety of precursor materials in an inexpensive and very rapid manner.

While the invention has been described with respect to certain specific embodiments thereof it will be understood that many variations are possible within the scope and spirit of the invention as defined by the appended claims.

I claim:

1. A flexible electrically conducting cloth, comprising:
   a plurality of intermingled or interwoven fibers of a refractory ceramic or of a refractory vitreous material, the sheet resistance of which exceeds 1,000 ohms per square; and
   a conducting coating encapsulating a majority of the fibers, said coating including at least about 70 atomic percent carbon, said coating being applied in sufficient quantity to render the cloth electrically conducting with a sheet resistance which lies between about 0.1 ohm per square and about 1,000 ohms per square, said coating having been formed by chemical vapor deposition at a temperature in a range from about 800° C. to about 1200° C.

2. A cloth as set forth in claim 1, wherein said coating is formed by directly applying an organic precursor to the fibers, the applying being at a temperature below the sublimation, boiling or decomposition temperature of the organic precursor and subjecting the fibers to chemical vapor deposition conditions including a temperature which falls within a range from about 800° C. to about 1200° C., in the absence of oxygen, the organic precursor being selected to be substantially completely converted, by sublimation, boiling and/or decomposition, to one or more vaporous species in said deposition zone and further being selected to either (1) sublime or boil at a temperature in excess of about 400° C. or (2) to not decompose at a temperature of below about 300° C. if said organic precursor decomposes at a temperature below its sublimation or boiling temperature, to form said vaporous species.

3. A cloth as set forth in claim 1, wherein said coating comprises at least about 0.001 weight percent of said cloth and no more than about 17 weight percent of said cloth.

4. A flexible electrically conducting cloth, having a length and a breath, comprising:
   a plurality of intermingled or interwoven fibers of a refractory ceramic or of a refractory vitreous material the sheet resistance of which exceeds 1,000 ohms per square; and a conducting coating encapsulating a majority of the fibers, said coating including at least about 70 atomic percent carbon, said coating being applied in sufficient quantity to render the cloth electrically conducting with a sheet resistance which lies between about 0.1 ohm per square and about 1,000 ohms per square, said cloth having a resistance across its breadth uniform to within about ±10% and a controllable resistance along its length.

5. A cloth as set forth in claim 4, wherein said resistance is uniform along its length within about ±10%.

6. A cloth as set forth in claim 4, wherein said coating comprises at least about 0.001 weight percent of said cloth and no more than about 17 weight percent of said cloth.

7. A cloth as set forth in claim 4, wherein said coating is formed by chemical vapor deposition at a temperature in a range from about 800° C. to about 1200° C.

8. A cloth as set forth in claim 7, wherein said coating is formed by directly applying an organic precursor to the fibers, the applying being at a temperature below the sublimation, boiling or decomposition temperature of the organic precursor and subjecting the fibers to chemical vapor deposition conditions in said temperature range, in the absence of oxygen, the organic precursor being selected to be substantially completely converted, by sublimation, boiling and/or decomposition, to one or more vaper species in said decomposition zone and further being selected to either (1) sublime or boil at a temperature in excess of about 400° C. or (2) to not decompose at a temperature below about 300° C. if said organic precursor decomposes at a temperature below its sublimation or boiling temperature, to form said vapor species.

* * * * *